United States Patent
Le Cornec

(10) Patent No.: US 11,511,713 B2
(45) Date of Patent: Nov. 29, 2022

(54) ELECTRONIC DEVICE FOR DETERMINING AN EMERGENCY STOPPING TRAJECTORY OF AN AUTONOMOUS VEHICLE, RELATED VEHICLE AND METHOD

(71) Applicant: TRANSDEV GROUP, Issy les Moulineaux (FR)

(72) Inventor: Olivier Le Cornec, Palaiseau (FR)

(73) Assignee: TRANSDEV GROUP INNOVATION, Issy-les-Moulineaux (FR)

( * ) Notice: Subject to any disclaimer, the term of this patent is extended or adjusted under 35 U.S.C. 154(b) by 251 days.

(21) Appl. No.: 16/570,562

(22) Filed: Sep. 13, 2019

(65) Prior Publication Data

US 2020/0086837 A1    Mar. 19, 2020

(30) Foreign Application Priority Data

Sep. 19, 2018 (FR) ..................... 18 58488

(51) Int. Cl.
*B60T 8/00* (2006.01)
*B60T 8/1755* (2006.01)
(Continued)

(52) U.S. Cl.
CPC ............ *B60T 8/17558* (2013.01); *B60T 7/12* (2013.01); *B60W 10/18* (2013.01); *B60W 30/06* (2013.01);
(Continued)

(58) Field of Classification Search
CPC .... B60T 8/17558; B60T 7/12; B60T 2201/02; B60T 2210/32; B60T 2270/40;
(Continued)

(56) References Cited

U.S. PATENT DOCUMENTS 9,399,472 B2   7/2016 Minoiu-Enache
2017/0057510 A1*  3/2017 Herbach ............ B62D 15/0265
(Continued)

FOREIGN PATENT DOCUMENTS

DE   102015003124 A1   9/2016
EP        3363698 A1   8/2018
WO     2013150244 A1  10/2013

OTHER PUBLICATIONS

Search Report for French Application No. FR 18 58488 dated Apr. 30, 2019.

(Continued)

*Primary Examiner* — Truc M Do
(74) *Attorney, Agent, or Firm* — Pearne & Gordon LLP

(57) ABSTRACT

An electronic device for stopping a vehicle can be activated automatically in the presence of an emergency stopping instruction. A module calculates at least one automatic movement setpoint of the vehicle in order to follow an emergency stopping trajectory comprising a plurality of successive emergency stopping vectors each associated with a separate segment of a portion of the successive segments of the predefined trajectory, from at least for each emergency stopping vector: a stored last actual movement vector of the autonomous vehicle, the predefined movement trajectory of the autonomous vehicle, and a stored last location datum of the autonomous vehicle, and delivered by at least one sensor of the autonomous vehicle. An emergency steering module is capable of steering the vehicle according to said at least one setpoint.

9 Claims, 3 Drawing Sheets

(51) Int. Cl.
  *B60T 7/12* (2006.01)
  *B60W 10/18* (2012.01)
  *B60W 30/06* (2006.01)
  *G05D 1/00* (2006.01)

(52) U.S. Cl.
  CPC ...... *G05D 1/0055* (2013.01); *B60K 2370/175* (2019.05); *B60T 2201/02* (2013.01); *B60T 2210/32* (2013.01); *B60T 2270/40* (2013.01); *G05D 2201/0213* (2013.01)

(58) Field of Classification Search
  CPC .... B60W 10/18; B60W 30/06; G05D 1/0055; G05D 2201/0213; B60K 2370/175
  See application file for complete search history.

(56) References Cited

U.S. PATENT DOCUMENTS

2018/0259966 A1* 9/2018 Long ................... G05D 1/0246
2019/0317520 A1* 10/2019 Zhang ................. G05D 1/0088

OTHER PUBLICATIONS

Nagdici, Silvua et al., "Fail-Safe Motion Planning of Autonomous Vehicles", 2016 IEEE 19th International Conference on Intelligent Transportation Systems (ITSC), IEEE, Nov. 1, 2016) (Nov. 1, 2016), pp. 542-458, XP033028383, DOI: 10.1109/ITSC.2016.7795594.

* cited by examiner

ELECTRONIC DEVICE FOR DETERMINING AN EMERGENCY STOPPING TRAJECTORY OF AN AUTONOMOUS VEHICLE, RELATED VEHICLE AND METHOD

This application claims priority of French patent application no. 18 58488 filed Sep. 19, 2018, which is incorporated by reference herein in its entirety.

FIELD OF THE INVENTION

The present invention relates to a device for determining an emergency stopping trajectory of an autonomous vehicle provided with an autonomous driving module, the autonomous vehicle being able to store, beforehand, at least one predefined movement trajectory comprising a plurality of successive reference vectors respectively associated with different successive movement segments of the autonomous vehicle.

The invention also relates to an autonomous vehicle provided with an autonomous driving module, the autonomous vehicle being able to store, beforehand, at least one predefined movement trajectory comprising a plurality of successive reference vectors respectively associated with different successive movement segments of the autonomous vehicle, the autonomous vehicle comprising at least one location data sensor of the autonomous vehicle.

The invention also relates to a method for determining an emergency stopping trajectory of an autonomous vehicle provided with an autonomous driving module, the autonomous vehicle being able to store, beforehand, at least one predefined movement trajectory comprising a plurality of successive reference vectors respectively associated with different successive movement segments of the autonomous vehicle.

The invention also relates to an associated computer program product.

BACKGROUND OF THE INVENTION

Currently, the devices for determining an emergency stopping trajectory of an autonomous vehicle, activated, for example, in case of failure of the autonomous driving module, are based solely on the use of the last movement vector of the autonomous vehicle (i.e., before failure of the autonomous driving module) in order to determine the emergency stopping vector and the associated automatic movement setpoint of the autonomous vehicle.

Such a setpoint determined by the known devices for determining an emergency stopping trajectory of an autonomous vehicle most often corresponds to the combination of a movement direction instruction tangent to the movement trajectory of the autonomous vehicle before the failure, and an abrupt deceleration instruction causing a reduction in the instantaneous speed of the autonomous vehicle to a value below or equal to 20 km/h.

The obtained automatic emergency braking is then violent, uncomfortable and relatively unsafe for the passengers of the autonomous vehicle, especially if the passengers are for example passengers standing inside the autonomous mass transit vehicle.

Furthermore, considering the distance needed to stop the autonomous vehicle, even if abrupt automatic braking is applied, it is likely that the curvature of the track on which the autonomous vehicle is moving changes during this stopping and that as a result, the autonomous vehicle leaves the road, which is a risky situation, which in the conventional case of an autonomous vehicle steered manually, results in the driver taking back control.

SUMMARY OF THE INVENTION

One aim of the invention is therefore to optimize the emergency stopping trajectory and the associated braking of an autonomous vehicle so as to improve the associated road safety.

Another aim of the invention is, as much as possible, to maintain a non-nil movement speed of the autonomous vehicle, in particular when the failure of the autonomous driving module or any other situation requiring an emergency stop arises in a presence zone of the autonomous vehicle corresponding to an at-risk driving zone characterized by the presence of intersection(s), pedestrian(s) or other vehicle(s) that may or may not be autonomous.

To that end, the invention relates to a device for determining an emergency stopping trajectory of an autonomous vehicle provided with an autonomous driving module of the aforementioned type, wherein the device for determining an emergency stopping trajectory is able to be activated automatically in the presence of an emergency stopping instruction, and comprises:
- a module for calculating at least one automatic movement setpoint of the autonomous vehicle in order to follow an emergency stopping trajectory comprising a plurality of successive emergency stopping vectors each associated with a separate segment of a portion of the successive segments of the predefined trajectory, from at least for each emergency stopping vector:
  - a stored last actual movement vector of the autonomous vehicle,
  - the predefined movement trajectory of the autonomous vehicle, and
  - a stored last location datum of the autonomous vehicle, and delivered by at least one sensor of the autonomous vehicle,
- an emergency steering module capable of steering the autonomous vehicle according to said at least one setpoint.

Thus, owing to the invention, the associated emergency stopping trajectory and movement setpoint of the autonomous vehicle are optimized, since they are determined not only from the last movement vector of the autonomous vehicle, but also from the predefined trajectory as well as, for each segment of this predefined trajectory, from a location datum of the autonomous vehicle allowing a correction and a reoptimization in real time of the emergency stopping at each segment of advance of the autonomous vehicle.

Such an optimization implemented by the device controlling the automatic emergency braking according to the invention allows a "gentle" deceleration of the autonomous vehicle, since the trajectory is controlled/corrected segment by segment to prevent a deviation (i.e., an offset of the autonomous vehicle) from the emergency stopping trajectory above a predetermined threshold relative to the predefined trajectory followed prior to the emergency situation requiring emergency stopping, such as a failure of the autonomous driving module.

For example, according to the invention, a deceleration decreasing the value of the speed of the autonomous vehicle before failure of the autonomous driving module from about 70 km/h to about 40 to 50 km/h is obtained while continuing the turns started before failure, versus, for the existing devices for determining an emergency stopping trajectory, a deceleration, in a direction tangent to the turn, and abrupt, reducing the speed to a value of 20 km/h maximum.

According to specific embodiments of the invention, the device for determining an emergency stopping trajectory also has one or more of the following features, considered alone or according to any technically possible combination(s):

- for each considered segment of the emergency stopping trajectory with which an emergency stopping vector is respectively associated, the calculating module is configured to determine the movement setpoint of the autonomous vehicle capable of making the emergency stopping vector associated with said considered segment substantially collinear to the reference vector associated with the same considered segment of the predefined trajectory, from the last actual movement vector of the autonomous vehicle and said at least one location datum that are associated with the segment preceding the considered segment;
- for the first segment of the emergency stopping trajectory, the calculating module is configured to determine the movement setpoint of the autonomous vehicle capable of making the first emergency stopping vector associated with said first considered segment collinear to the reference vector associated with this same first segment, at least from the last actual movement vector $V_D$ of the autonomous vehicle A and the last location datum of the autonomous vehicle A that are stored at a moment preceding the reception, or the generation, of the emergency stopping instruction;
- the calculating module is able to take account of a predefined trajectory where the segments overlap;
- the movement setpoint comprises at least:
- an instruction representative of a direction to be followed, and/or
- an instruction representative of an instantaneous movement speed.
- the device for determining an emergency stopping trajectory further comprises a module for detecting a failure of the autonomous driving module, for a considered movement segment, by determining a deviation above a predetermined threshold between the actual movement vector of the autonomous vehicle and the reference vector that are associated with the considered segment, and/or by determining the position of the vehicle outside its own authorized circulation zone, the failure detection module being capable of activating the calculation module in case of detected failure of the autonomous driving module;
- the device for determining an emergency stopping trajectory further comprises an obstacle avoidance module on the emergency stopping trajectory capable of communicating with the calculating module for at least one automatic movement setpoint of the autonomous vehicle, the calculating module being able to adapt the setpoint based on the obstacle detection;
- the obstacle avoidance module is able to implement processing of data delivered by at least one sensor on board the autonomous vehicle belonging to the group comprising:
- geolocation equipment,
- a lidar,
- a camera,
- an odometer,
- device for determining a current heading of the autonomous vehicle,
- an inertial unit.

The invention also relates to an autonomous vehicle comprising at least one device for determining an emergency stopping trajectory as defined above.

The invention also relates to a method for determining an emergency stopping trajectory as defined above, the method being able to be activated automatically in the presence of an emergency stopping instruction, and comprising the following steps:

- calculating at least one automatic movement setpoint of the autonomous vehicle in order to follow an emergency stopping trajectory comprising a plurality of successive emergency stopping vectors each associated with a separate segment of a portion of the successive segments of the predefined trajectory, from at least for each emergency stopping vector:
  - a stored last actual movement vector of the autonomous vehicle,
  - the predefined movement trajectory of the autonomous vehicle, and
  - a stored last location datum of the autonomous vehicle, and delivered by at least one sensor of the autonomous vehicle,
- driving the autonomous vehicle by steering the autonomous vehicle according to said at least one setpoint.

BRIEF DESCRIPTION OF THE DRAWINGS

Other features and advantages of the invention will appear upon reading the following description, provided solely as an example and done in reference to the appended drawings, in which.

DETAILED DESCRIPTION OF PREFERRED EMBODIMENTS

In the rest of the description, the expression "substantially equal to" designates a relationship of equality to within plus or minus 10%, preferably to within plus or minus 5%.

Furthermore, hereinafter, "stored last actual movement vector of the autonomous vehicle" and "stored last location datum of the autonomous vehicle" refer to the actual movement vector and the location datum of the autonomous vehicle that are most recently stored relative to a current calculation moment of an automatic movement setpoint of the vehicle to follow an emergency stopping trajectory.

Figure 1:
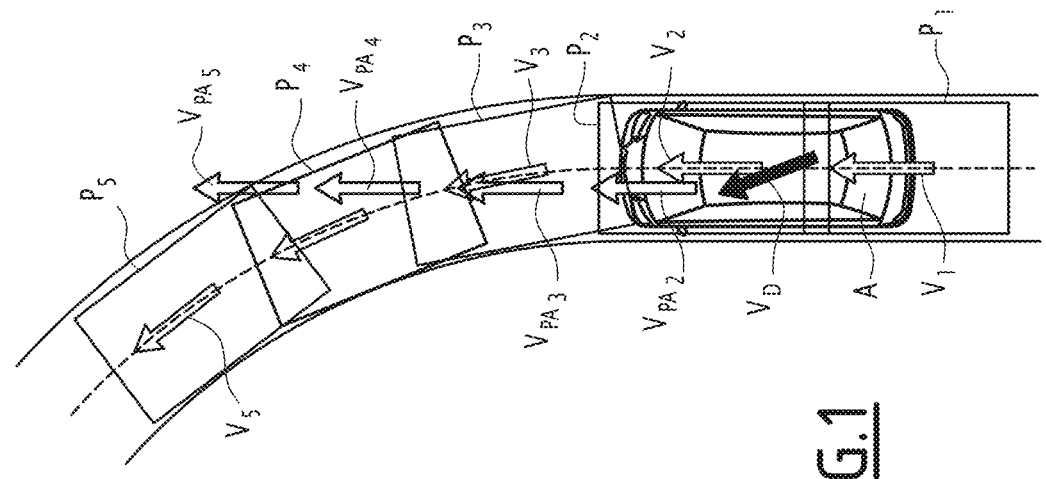
FIG. 1 is a schematic illustration of the determination of an emergency stopping trajectory conventionally implemented.

In FIG. 1, an autonomous vehicle A, here for example an automobile, is considered.

The motor vehicle A comprises, in a known manner, rear wheels, front wheels, a motor (not shown) mechanically connected via a transmission chain (not shown) to the rear and/or front wheels for the driving of said wheels in rotation around their axis, a steering system (not shown), suitable for acting on the wheels of the vehicle A so as to modify the orientation of its trajectory, and a braking system (not shown), suitable for exerting a braking force on the wheels of the vehicle A.

The motor vehicle is typically made up of a traction and/or electric propulsion vehicle. To that end, the motor (not shown) is made up of an electric motor, and the vehicle A comprises an electric battery (not shown) electrically connected to the motor to supply the motor with electricity.

The motor vehicle A being an autonomous vehicle, to that end it comprises an electronic autonomous driving device (not shown) suitable for controlling the vehicle autonomously by receiving information on the environment of the vehicle by means of sensors (not shown) and by acting on the motor, the steering system and the braking system, so as to modify the speed, the acceleration and the trajectory of the vehicle in response to the received information.

Conventionally, the autonomous vehicle A moves on a road, the outline of which constitutes a predefined trajectory able to be stored within the autonomous vehicle A. Such a predefined movement trajectory comprises a plurality of reference vectors $V_1, V_2, V_3, V_4, V_5$ respectively associated with successive different segments $P_1, P_2, P_3, P_4, P_5$. In other words, on the segment $P_1$, in a nominal situation, the autonomous vehicle A is able to substantially follow the vector $V_1$, while on the turning portion $P_4$, the autonomous vehicle A is able to substantially follow the vector $V_4$.

In relation to FIG. 1, the emergency stopping trajectory conventionally followed by an autonomous vehicle, to automatically brake in the presence of an emergency stopping instruction, is established from the last actual movement vector $V_D$ of the autonomous vehicle A. Such a last actual movement vector $V_D$ of the autonomous vehicle A is determined before the generation of the emergency stopping instruction in order to obtain a movement consistent with the last actual movement vector $V_D$ of the vehicle prior to the generation of the emergency stopping instruction, corresponding in FIG. 1 to a movement tangent to the predefined trajectory. In FIG. 1, the generation of the emergency stopping instruction takes place during the travel of the segment $P_2$ and for example corresponds to the presence of a failure of the autonomous driving module.

The emergency stopping trajectory, conventionally obtained from the last actual movement vector $V_D$ of the autonomous vehicle A, is made up, for the segment $P_2$, of the vector $V_{PA2}$, for the segment $P_3$ of the vector $V_{PA3}$, for the segment $P_4$ of the vector $V_{PA4}$, such that the resultant automatic movement is tangent to the turn and causes a departure from the road.

Furthermore, such an emergency stopping trajectory capable of causing a departure from the road in case of turning is accompanied by an abrupt deceleration causing a reduction in the instantaneous speed of the autonomous vehicle to a value of less than or equal to 20 km/h.

Figure 2:
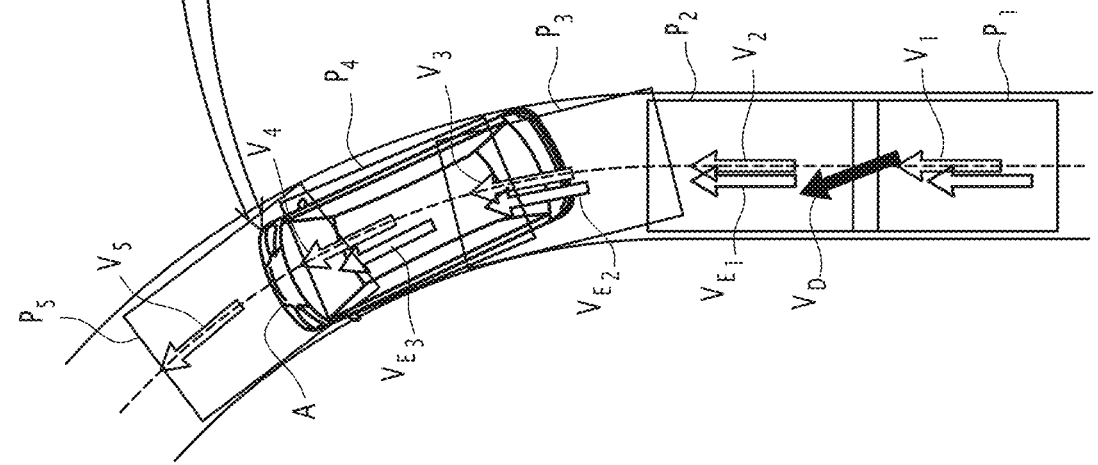
FIG. 2 is a schematic illustration of the determination of an emergency stopping trajectory according to one embodiment of the present invention.

In FIG. 2, the electronic device 10 for determining an emergency stopping trajectory according to the present invention is shown as well as the emergency stopping trajectory obtained by this device in a situation identical to that of FIG. 1.

In the example of FIG. 2, the electronic device 10 for determining an emergency stopping trajectory comprises an information processing unit (not shown) for example formed by a memory 12 and a processor (not shown) associated with the memory 12. The memory 12 is able to store the predefined movement trajectory of the autonomous vehicle A comprising a plurality of reference vectors $V_1, V_2, V_3, V_4, V_5$ respectively associated with segments $P_1, P_2, P_3, P_4, P_5$.

The electronic device 10 for determining an emergency stopping trajectory further comprises a module 14 for calculating at least one automatic movement setpoint of the autonomous vehicle A in order to follow an emergency stopping trajectory comprising a plurality of successive emergency stopping vectors $V_{E1}, V_{E2}, V_{E3}$ each associated with a separate segment $P_2, P_3, P_4$ of a portion of the successive segments of the predefined trajectory, from at least for each emergency stopping vector $V_{E1}, V_{E2}, V_{E3}$:
  a stored last actual movement vector of the autonomous vehicle A,
  the predefined movement trajectory of the autonomous vehicle, and
  a stored last location datum POS_A of the autonomous vehicle A, and delivered by at least one sensor of the autonomous vehicle.

Furthermore, the device 10 comprises an emergency steering module 16 capable of steering the autonomous vehicle according to said at least one setpoint determined by the calculating module 14.

In particular, the movement setpoint comprises at least one instruction representative of the direction to be followed (i.e., the successive emergency stopping vectors $V_{E1}, V_{E2}, V_{E3}$), and/or an instruction representative of an instantaneous movement speed for example corresponding to a deceleration force (i.e., a braking force) to be applied, or directly to the movement speed that the autonomous vehicle A must implement as described later in connection with FIG. 5.

According to one specific aspect, the location datum POS_A is a curved coordinate datum comprising an x-axis and a curved y-axis of the autonomous vehicle A defined in a predefined coordinate system such as a land-based coordinate system. Such a datum is delivered by at least one sensor of the autonomous vehicle A belonging to the group comprising:
  an odometer capable of calculating the movement of the autonomous vehicle A from one segment to another based on the number of rotations of the wheels,
  a piece of geolocation equipment configured to determine the position of the autonomous vehicle A,
  a device for determining the current heading of the autonomous vehicle A configured for example to estimate the heading of the vehicle as a function of the angle of the steering system relative to a predetermined reference position (e.g., the steering system comprises a steering wheel whereof the rotation angle relative to the predetermined reference position is representative of the heading of the autonomous vehicle A),
  an inertial measurement unit, combining a plurality of accelerometers and gyroscopes, capable of precisely (i.e., with a precision above a predetermined threshold) delivering the heating and instantaneous speed estimates of the autonomous vehicle A in particular by using the acceleration data, the rotation speeds, or even the magnetic field variations surrounding the autonomous vehicle A.

According to a first aspect, for each considered segment of the emergency stopping trajectory with which an emergency stopping vector $V_{E1}, V_{E2}, V_{E3}$ is respectively associated, the calculating module 14 is configured to determine the movement setpoint of the autonomous vehicle A capable of making the emergency stopping vectors $V_{E1}, V_{E2}, V_{E3}$ respectively associated with the considered segments $P_2, P_3, P_4$ substantially collinear to the reference vectors $V_2, V_3, V_4$ respectively associated with the same considered segments $P_2$, $P_3$, $P_4$ of the predefined trajectory, from the last actual movement vector of the autonomous vehicle A and said at least one location datum POS_A that are associated with the segment preceding the considered segment.

More specifically, for the first segment $P_2$ of the emergency stopping trajectory, the calculating module 14 is configured to determine the movement setpoint of the autonomous vehicle A capable of making the first emergency stopping vector $V_{E1}$ associated with said first considered segment $P_2$ collinear to the reference vector $V_2$ associated with this same first segment $P_2$, at least from the last actual movement vector $V_D$ of the autonomous vehicle A and the last location datum of the autonomous vehicle A that are stored at a moment preceding the reception, or as an alternative, at a moment the generation, of the emergency stopping instruction.

In other words, the movement setpoint comprises at least the movement instruction that allows the vehicle to go from the movement direction $V_D$ to the movement direction $V_{E1}$ collinear to the vector $V_1$ of the predefined trajectory, and so forth, segment by segment such that the emergency stopping trajectory, according to the invention as illustrated in FIG. 2, and made up at least of emergency stopping vectors $V_{E1}$, $V_{E2}$, $V_{E3}$, "follows" the turn of the road taken by the autonomous vehicle A instead of leaving the road as previously conventionally obtained as illustrated by FIG. 1.

The electronic device 10 for determining an emergency stopping trajectory thus makes it possible to engage a minimal risk maneuver (MRM).

Such a setpoint is for example determined using a reference table stored within the memory 12 of the electronic device for determining an emergency stopping trajectory, as well as the predefined movement trajectory.

Such a reference table is able to associate each location of the autonomous vehicle A on the predefined trajectory with the direction to be followed by the autonomous vehicle and the movement speed and/or the deceleration to be applied to the autonomous vehicle by taking account of the last actual movement vector stored for this autonomous vehicle A.

As an optional addition, such a reference table also associates each location with an indicator representative of a dangerousness level of the location, for example to indicate the presence of an intersection, a cul-de-sac, a zone with a high pedestrian density, etc.

According to another variant, such a reference table is able to take account of an intrinsic parameter representative of the lag time of the braking system specific to the autonomous vehicle A, this lag time corresponding to the interval between the sending of an instruction to the braking system and the corresponding actual braking.

Such an ability to remain on the predefined trajectory further makes it possible to optimize the emergency stopping speed, which makes it possible to avoid an abrupt deceleration, since the stopping trajectory conventionally used shown in FIG. 1 and leading to a departure from the road is avoided.

According to one particular aspect, the calculating module 14 is able to take account of a predefined trajectory where the segments $P_1$, $P_2$, $P_3$, $P_4$, $P_5$ overlap. This aspect in particular makes it possible to increase the precision of the emergency stopping trajectory so that the successive location data of the autonomous vehicle, for example the curvilinear coordinates of the autonomous vehicle A associated with each segment, form a substantially continuous curve (taking account of a discretization on the order of ten milliseconds depending on the shape of the trajectory).

As an optional addition, the device 10 comprises a receiving module 18 for receiving an emergency stopping instruction causing the activation of the other calculating 14 and emergency steering 16 modules that it comprises.

According to a first example, the emergency stopping instruction is for example emitted by an external supervision platform (not shown) of a set of autonomous vehicles to which the autonomous vehicle A belongs, in case of detection of a predetermined event, the type of which belongs to the group comprising: a type of weather event, such as fog, ice, snow, rain, wind; an abnormal density of traffic events; and a type of attack, such as a cyberattack, a terrorist attack.

According to a second example, the emergency stopping instruction is for example emitted by the autonomous driving module of the autonomous vehicle A in case of autodetection (i.e., by the autonomous driving module itself) of a failure thereof.

As an alternative to the receiving module 18 (not shown), the device 10 further comprises a module for detecting a failure of the autonomous driving module, for a considered movement segment $P_2$, by determining a deviation above a predetermined threshold between the actual movement vector of the autonomous vehicle A and the reference vector that are associated with the considered segment, the failure detection module being capable of activating, by generating and sending the emergency stopping instruction, the calculation module 14 in case of detected failure of the autonomous driving module.

Figure 3:
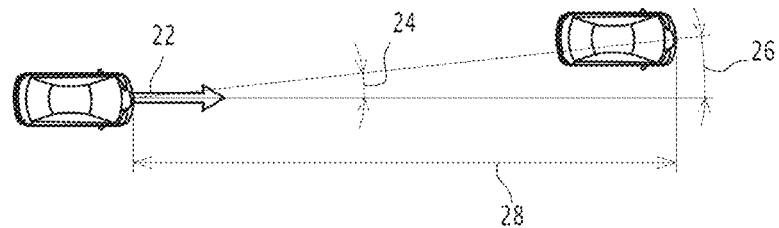
FIG. 3 is a schematic illustration of the offset of an autonomous vehicle relative to the predefined trajectory to be followed.

The predetermined threshold for example corresponds to a maximum lateral offset value of the vehicle relative to the predefined trajectory as illustrated by FIG. 3, described hereinafter.

In other words, according to this alternative, the electronic device 10 for determining an emergency stopping trajectory is also capable of monitoring and detecting an operating anomaly of the autonomous driving module of the autonomous vehicle, and thus performs a dual function.

In the example of FIG. 2, the calculating module 14, the emergency steering module 16 and, optionally, the receiving module 18 are each made in the form of software, or a software module, executable by the processor.

The memory 12 of the electronic device 10 for determining an emergency stopping trajectory is then able to store receiving software configured to receive the emergency stopping instruction, for example, emitted by an external supervision platform, calculating software configured to calculate the automatic movement setpoint of the autonomous vehicle A in order to monitor the emergency stopping trajectory from at least, for each emergency stopping vector $V_{E1}$, $V_{E2}$, $V_{E3}$ forming the emergency stopping trajectory:
    a stored last actual movement vector of the autonomous vehicle A,
    the predefined movement trajectory of the autonomous vehicle, and
    a stored last location datum of the autonomous vehicle A, and delivered by at least one sensor of the autonomous vehicle A, and emergency steering software capable of steering the autonomous vehicle A according to the automatic movement setpoint by sending corresponding instructions to the engine, the steering system and the braking system of the autonomous vehicle A so as to modify the speed, the acceleration and the trajectory of the autonomous vehicle A in reaction to the received information. The processor (not shown) of the device 10 is then able to execute each of the software applications from among the receiving software, the calculating software and the emergency steering software.

In a variant that is not shown, the calculating module 14, the emergency steering module 16 and, optionally, the receiving module 18 are each made in the form of a programmable logic component, such as an FPGA (Field Programmable Gate Array), or in the form of a dedicated integrated circuit, such as an ASIC (Applications Specific Integrated Circuit).

When the electronic device for determining an emergency stopping trajectory is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

According to one additional aspect, the electronic device for determining an emergency stopping trajectory 10 is enhanced with an obstacle avoidance module 20 on the emergency stopping trajectory capable of communicating with the calculating module 14 for at least one automatic movement setpoint of the autonomous vehicle A, the calculating module 14 being able to adapt the setpoint based on the obstacle detection.

More specifically, the obstacle avoidance module 20 is able to implement processing of data delivered by at least one sensor on board the autonomous vehicle A belonging to the group comprising:
- geolocation equipment,
- a lidar,
- a camera,
- an odometer,
- device for determining a current heading of the autonomous vehicle (A),
- an inertial unit.

In particular, in the presence of a detected obstacle, the obstacle avoidance module 20 is able to modify one or several element(s) of the movement setpoint, namely to modify the instruction representative of the direction to be followed and/or to modify the direction representative of the instantaneous movement speed.

For example, before the obstacle detection, the autonomous vehicle A moves according to the invention over the segment $P_2$ in the direction of the emergency stopping vector $V_{E1}$ with a speed of 40 km/h. The lidar (not shown) of the autonomous vehicle A detects a pedestrian on the segment $P_3$ and the precise position (i.e., the precise curvilinear coordinates) POS_P of this pedestrian on this segment $P_3$. When no obstacle is present, and using the reference table, the autonomous vehicle A would have moved with the same speed of 40 km/h and according to the same emergency stopping vector $V_{E3}$ steering the autonomous vehicle A toward the pedestrian P.

In the presence of a detected pedestrian, the obstacle avoidance module 20 uses the position POS_P to determine the distance separating the autonomous vehicle A from the pedestrian P and the deceleration to be applied to stop before the obstacle and/or, if the predefined trajectory allows it, the emergency stopping vector $V_{E3m-eo}$ to be applied in order to avoid an impact between pedestrian and autonomous vehicle while having a non-nil speed.

According to the example of FIG. 2, the aforementioned electronic device for determining an emergency stopping trajectory 10 is on board the autonomous vehicle A.

According to an alternative (not shown), the aforementioned electronic device for determining an emergency stopping trajectory 10 is housed within an external platform for remote supervision of the autonomous vehicle and capable of communicating the steering instructions established by the emergency steering module to a receiver of the autonomous vehicle A capable of retransmitting these instructions to the engine, the steering system and the braking system of the autonomous vehicle so as to modify the speed, the acceleration and the trajectory of the autonomous vehicle in reaction to the received information.

FIG. 3 is a schematic illustration of the offset of an autonomous vehicle A relative to the predefined trajectory to be followed. More specifically, an autonomous vehicle A is considered moving along a movement direction 22 with a speed V. Each autonomous vehicle is characterized by another intrinsic heading error parameter 24 generally expressed in degrees that represents the angle between the predefined trajectory and the maximum authorized lateral offset 26 of the vehicle relative to the predefined trajectory.

For example, if one considers a path whereof the road width is 3 meters and a vehicle that is 2 meters wide, the maximum lateral offset 26 is 50 centimeters.

Taking into account the speed V, the position POS_A of the vehicle A, the heading error 24 and the maximum authorized offset, the stopping distance 28 is obtained. Increasing the speed $V_i$ of the autonomous vehicle A decreases the stopping distance 28 and vice versa.

Figure 4:
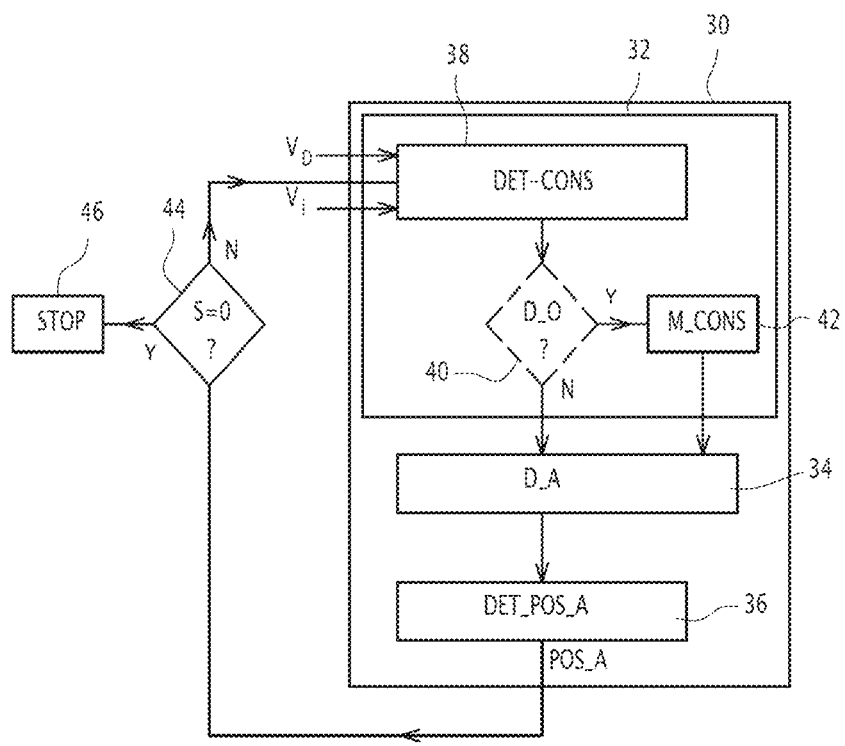
FIG. 4 is a flowchart of a method, according to the invention, for determining an emergency stopping trajectory according to the emergency stopping trajectory of FIG. 2.

The operation of the electronic device for determining an emergency stopping trajectory 10 according to the invention will now be explained using FIG. 4 showing a flowchart of the method 30, according to the invention, for determining an emergency stopping trajectory, the method 30 being implemented by the electronic monitoring device 10.

During an initial step 32, the electronic device for determining an emergency stopping trajectory 10 calculates, via the calculating module 14, at least one automatic movement setpoint of the autonomous vehicle A in order to follow an emergency stopping trajectory comprising a plurality of successive emergency stopping vectors $V_{E1}$, $V_{E2}$, $V_{E3}$ each associated with a separate segment $P_2$, $P_3$, $P_4$ of a portion of the successive segments of the predefined trajectory, from at least for each emergency stopping vector $V_{E1}$, $V_{E2}$, $V_{E3}$:
- a stored last actual movement vector of the autonomous vehicle A,
- the predefined movement trajectory of the autonomous vehicle, and
- a stored last location datum POS_A of the autonomous vehicle A, and delivered by at least one sensor of the autonomous vehicle A.

The electronic device for determining an emergency stopping trajectory 10 steers, during step 34, via its emergency steering module 16, the autonomous vehicle A by directing it toward said at least one setpoint.

Then, during step 36, the electronic device for determining an emergency stopping trajectory 10 determines the position POS_A resulting from the application of the setpoint.

According to one additional and optional aspect, during the calculating step 32, the electronic device for determining an emergency stopping trajectory 10 determines, during the sub-step 38, the aforementioned setpoint, then during a sub-step 40, determines the presence (Y)/absence (N) of an obstacle on the emergency stopping trajectory resulting from the application of the setpoint.

In the presence Y of an obstacle, the electronic device for determining an emergency stopping trajectory 10 determines, during sub-step 42, a modified setpoint so as to stop the vehicle before the obstacle and/or to modify its trajectory in order to bypass the obstacle.

In the absence N of an obstacle, the electronic device for determining an emergency stopping trajectory 10 goes to the sub-step for determining the presence (Y)/absence (N) of an obstacle in the aforementioned steering step 34 without modifying the setpoint.

The method 30 according to the invention is an iterative method, the aforementioned steps being repeated for each segment $P_2$, $P_3$, $P_4$ of the emergency stopping trajectory, as long as during a step 44, the device 10 has not determined that the state S of the autonomous vehicle was stopped (nil value), the determining sub-step 38 using, upon each iteration, the last movement vector and the last position (i.e., location) of the autonomous vehicle stored in the previous iteration associated with the segment preceding the current calculation moment.

In the presence of this stopped state (=0) determined during step 44, the device 10 retrieves, during a step 46, information representative of the stopped state of the vehicle.

Figure 5:
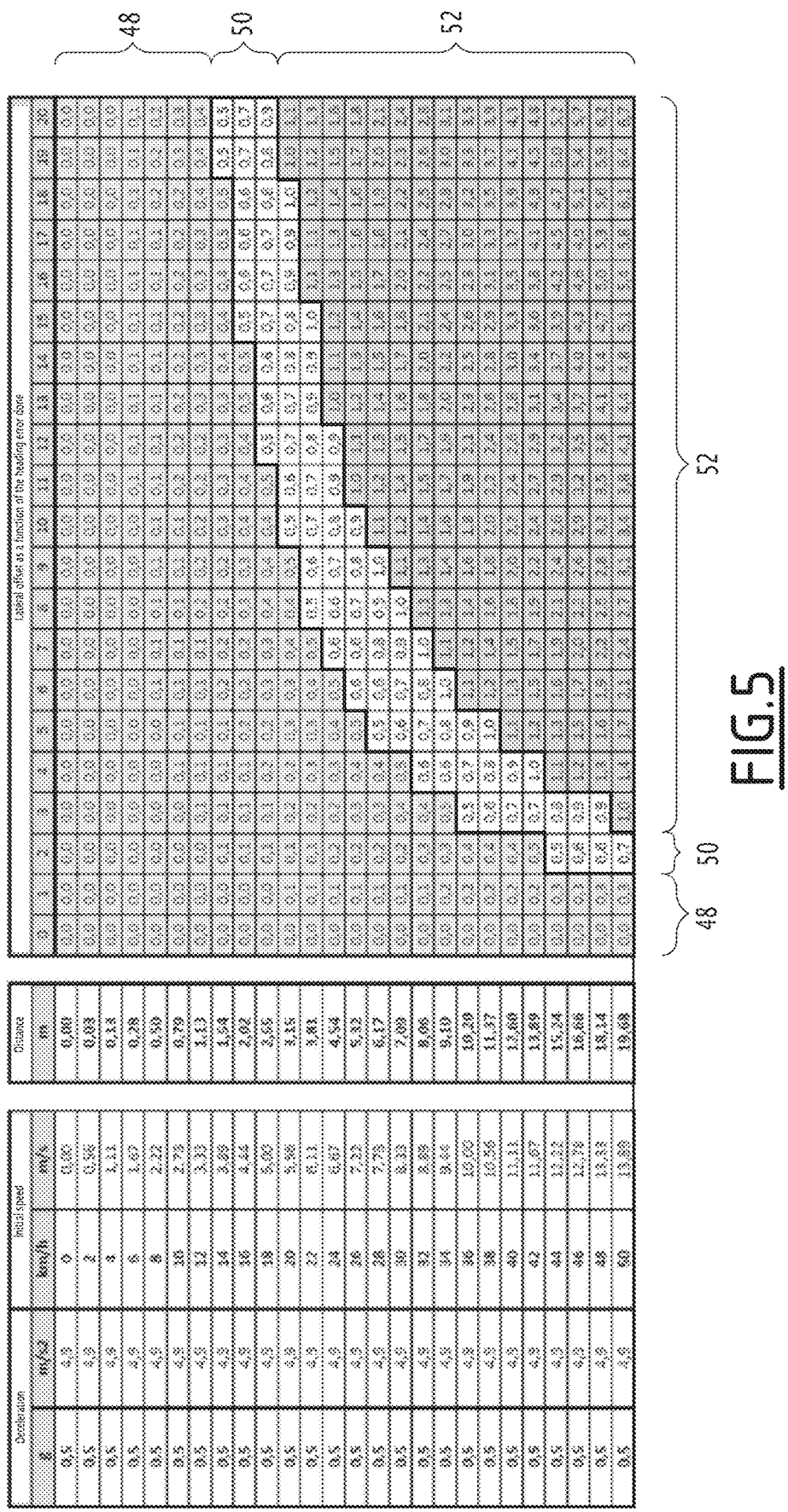
FIG. 5 illustrates the lateral offset of the autonomous vehicle based on the initial speed of the autonomous vehicle preceding the implementation of the method according to the invention and based on the heading error specific to each autonomous vehicle.

The lateral offset of the autonomous vehicle A as a function of the speed of the autonomous vehicle $V_i$ preceding the failure of the autonomous driving module and as a function of the heading error specific to each autonomous vehicle is shown in FIG. 5.

The data set indicated as an example in FIG. 5 is for example incorporated into the aforementioned reference table in order to determine the automatic movement setpoint to be applied in particular [to] the instruction representative of an instantaneous movement speed for example corresponding to a deceleration force (i.e., a braking force) to be applied, or directly to the movement speed that the autonomous vehicle A must implement.

Such a data set illustrated by FIG. 5 is for example distributed into three zones associated with the lateral offset values 26, namely a zone 48 where the obtained lateral offset is acceptable, a zone 50 where the lateral offset is no longer acceptable that has a minor risk, and a zone 52 where the lateral offset is no longer acceptable and has a major risk.

Thus, an autonomous vehicle A having an intrinsic heading error characteristic of 20°, an initial speed of 12 km/h and using a deceleration of 0.5 g has a stopping distance of 1.13 m to remain below the maximum authorized lateral offset equal to 50 centimeters if one considers a path whose road width is 3 meters and a vehicle measuring 2 meters wide.

Likewise, an autonomous vehicle A having an intrinsic heading error characteristic of 1°, an initial speed of 50 km/h using a deceleration of 0.5 g has a stopping distance of 19.68 meters to remain below the maximum authorized lateral offset equal to 50 centimeters.

The electronic device for determining an emergency stopping trajectory 10 according to the invention then makes it possible to optimize the emergency stopping from a performance perspective by in particular avoiding leaving the road, and particularly when this is possible in terms of passenger comfort by adapting the deceleration level based on the predefined trajectory and its position on this predefined trajectory, the initial speed of the autonomous vehicle A and its movement vector $V_D$ stored prior to the emergency stopping instruction, and optionally in the presence of an obstacle.

One skilled in the art will in particular observe that the electronic device for determining an emergency stopping trajectory 10 according to the invention makes it possible to continue causing the vehicle to advance at a very low speed (e.g. at 5 km/h) in the event the zone where the autonomous vehicle A is located is considered to be dangerous (for example in order to avoid stopping in the middle of an intersection) as indicated, for example, using a predetermined indicator in the reference table for the position of the autonomous vehicle A.

One skilled in the art will also note that the electronic device for determining an emergency stopping trajectory 10 according to the invention is, according to an improved version, capable of being enhanced with an obstacle avoidance module 20 capable of bypassing an obstacle during braking, while guaranteeing that the autonomous vehicle A remains on the predefined trajectory.

According to another improved version, the electronic device for determining an emergency stopping trajectory 10 according to the invention is capable of being enhanced with a detection module of the autonomous driving module that it comprises in order to immediately offset this failure by taking over steering of the autonomous vehicle on an emergency stopping trajectory optimized in real time and secured.

One can thus see that the electronic device for determining an emergency stopping trajectory of an autonomous vehicle 10 according to the invention, and the associated method, make it possible to further improve the safety of the passengers on board such autonomous motor vehicles A.

The invention claimed is:

1. An electronic device for determining an emergency stopping trajectory of an autonomous vehicle provided with an autonomous driving module, the autonomous vehicle being able to store, beforehand, at least one predefined movement trajectory comprising a plurality of successive reference vectors respectively associated with different successive movement segments of the autonomous vehicle, wherein the electronic device for determining an emergency stopping trajectory is able to be activated automatically in the presence of an emergency stopping instruction, and comprises:

a calculating module for calculating at least one automatic movement setpoint of the autonomous vehicle in order to follow the emergency stopping trajectory comprising a plurality of successive emergency stopping vectors each associated with a separate segment of a portion of the successive segments of the at least one predefined movement trajectory, from at least for each emergency stopping vector:

a stored last actual movement vector of the autonomous vehicle, the at least one predefined movement trajectory of the autonomous vehicle, and a stored last location datum of the autonomous vehicle, and delivered by at least one sensor of the autonomous vehicle; and an emergency steering module capable of steering the autonomous vehicle according to said at least one automatic movement setpoint, wherein, for each considered segment of the emergency stopping trajectory with which an emergency stopping vector is respectively associated, the calculating module is configured to determine the at least one automatic movement setpoint of the autonomous vehicle capable of making the emergency stopping vector associated with said considered segment substantially collinear to the reference vector associated with the same considered segment of the at least one predefined movement trajectory, from the last actual movement vector of the autonomous vehicle and at said last location datum of the autonomous vehicle that are associated with the segment preceding the considered segment.

2. The device according to claim 1, wherein, for a first segment of the emergency stopping trajectory, the calculating module is configured to determine the at least one automatic movement setpoint of the autonomous vehicle capable of making a first emergency stopping vector associated with said first segment collinear to the reference vector associated with this same first segment, at least from the last actual movement vector of the autonomous vehicle and the last location datum of the autonomous vehicle that are stored at a moment preceding a reception, or a generation, of the emergency stopping instruction.

3. The device according to claim 1, wherein the calculating module is able to take account of the at least one predefined movement trajectory where the segments overlap.

4. The device according to claim 1, wherein the at least one automatic movement setpoint of the autonomous vehicle comprises at least:
an instruction representative of a direction to be followed, and/or
an instruction representative of an instantaneous movement speed.

5. The device according to claim 1, further comprising a failure detection module for detecting a failure of the autonomous driving module, for a considered movement segment, by determining a deviation above a predetermined threshold between the last actual movement vector of the autonomous vehicle and the reference vector that are associated with the considered movement segment, and/or by determining the position of the autonomous vehicle outside its own authorized circulation zone, the failure detection module being capable of activating the calculation module in case of detecting the failure of the autonomous driving module.

6. The device according to claim 1, further comprising an obstacle avoidance module on the emergency stopping trajectory capable of communicating with the calculating module for the at least one automatic movement setpoint of the autonomous vehicle, the calculating module being able to adapt the at least one automatic movement setpoint based on detection of an obstacle.

7. The device according to claim 6, wherein the obstacle avoidance module is able to implement processing of data delivered by the at least one sensor on board the autonomous vehicle, the at least one sensor belonging to the group comprising:
geolocation equipment,
a lidar,
a camera,
an odometer,
a device for determining a current heading of the autonomous vehicle,
an inertial unit.

8. An autonomous vehicle provided with an autonomous driving module, the autonomous vehicle being able to store, beforehand, at least one predefined movement trajectory comprising a plurality of successive reference vectors respectively associated with different successive movement segments of the autonomous vehicle, the autonomous vehicle comprising at least one location data sensor of the autonomous vehicle,
wherein the autonomous vehicle further comprises at least one electronic device for determining an emergency stopping trajectory able to be activated automatically in the presence of an emergency stopping instruction, the at least one electronic device comprising:
a calculating module for calculating at least one automatic movement setpoint of the autonomous vehicle in order to follow the emergency stopping trajectory comprising a plurality of successive emergency stopping vectors each associated with a separate segment of a portion of the successive segments of the at least one predefined movement trajectory, from at least for each emergency stopping vector:
a stored last actual movement vector of the autonomous vehicle,
the at least one predefined movement trajectory of the autonomous vehicle, and
a stored last location datum of the autonomous vehicle, and delivered by the at least one location data sensor of the autonomous vehicle; and
an emergency steering module capable of steering the autonomous vehicle according to said at least one automatic movement setpoint, wherein, for each considered segment of the emergency stopping trajectory with which an emergency stopping vector is respectively associated, the calculating module is configured to determine the at least one automatic movement setpoint of the autonomous vehicle capable of making the emergency stopping vector associated with said considered segment substantially collinear to the reference vector associated with the same considered segment of the at least one predefined movement trajectory, from the last actual movement vector of the autonomous vehicle and said last location datum of the autonomous vehicle that are associated with the segment preceding the considered segment.

9. A method for determining an emergency stopping trajectory of an autonomous vehicle provided with an autonomous driving module, the autonomous vehicle being able to store, beforehand, at least one predefined movement trajectory comprising a plurality of successive reference vectors respectively associated with different successive movement segments of the autonomous vehicle,
the method for determining the emergency stopping trajectory being able to be activated automatically in the presence of an emergency stopping instruction, and comprising:
calculating at least one automatic movement setpoint of the autonomous vehicle in order to follow an emergency stopping trajectory comprising a plurality of successive emergency stopping vectors each associated with a separate segment of a portion of the successive segments of the at least one predefined movement trajectory, from at least for each emergency stopping vector:
a stored last actual movement vector of the autonomous vehicle,
the at least one predefined movement trajectory of the autonomous vehicle, and
a stored last location datum of the autonomous vehicle, and delivered by at least one sensor of the autonomous vehicle; and emergency driving of the autonomous vehicle by steering the autonomous vehicle according to said at least one automatic movement setpoint, wherein, for each considered segment of the emergency stopping trajectory with which an emergency stopping vector is respectively associated, determining the at least one automatic movement setpoint of the autonomous vehicle capable of making the emergency stopping vector associated with said considered segment substantially collinear to the reference vector associated with the same considered segment of the at least one predefined movement trajectory, from the last actual movement vector of the autonomous vehicle and said last location datum of the autonomous vehicle that are associated with the segment preceding the considered segment.

\* \* \* \* \*